United States Patent [19]
Bienwald

[11] 3,950,066
[45] Apr. 13, 1976

[54] COVERED ELECTRICAL RECEPTACLE WITH SNAP-IN MOUNTING
[75] Inventor: Wolfgang F. Bienwald, Melville, N.Y.
[73] Assignee: Leviton Manufacturing Co., Inc., Little Neck, N.Y.
[22] Filed: Jan. 2, 1975
[21] Appl. No.: 538,024

[52] U.S. Cl. .............................................. 339/128
[51] Int. Cl.² .......................................... H02B 1/02
[58] Field of Search........... 339/91 L, 125 R, 125 L, 339/126 R, 128, 132 R, 133 R

[56] References Cited
UNITED STATES PATENTS
2,239,451   4/1941   Stearns .......................... 339/128 X
3,790,923   2/1974   Mathe ............................... 339/128

Primary Examiner—Joseph H. McGlynn
Assistant Examiner—Paul A. Bell
Attorney, Agent, or Firm—Hanse H. Hamilton

[57] ABSTRACT

The present invention provides a covered receptacle for a wiring device such as a lamp socket or the like which is mounted on a panel with a snap-in mounting. The snap-in mounting is releasable from engagement with the panel from within the receptacle when the cover is removed. Removal of the cover permits removal of the receptacle from the panel and provides access to the wiring device for repair or replacement as required. When in use, the cover encloses and prevents liquid or vapors from contacting the mounting mechanism.

5 Claims, 4 Drawing Figures

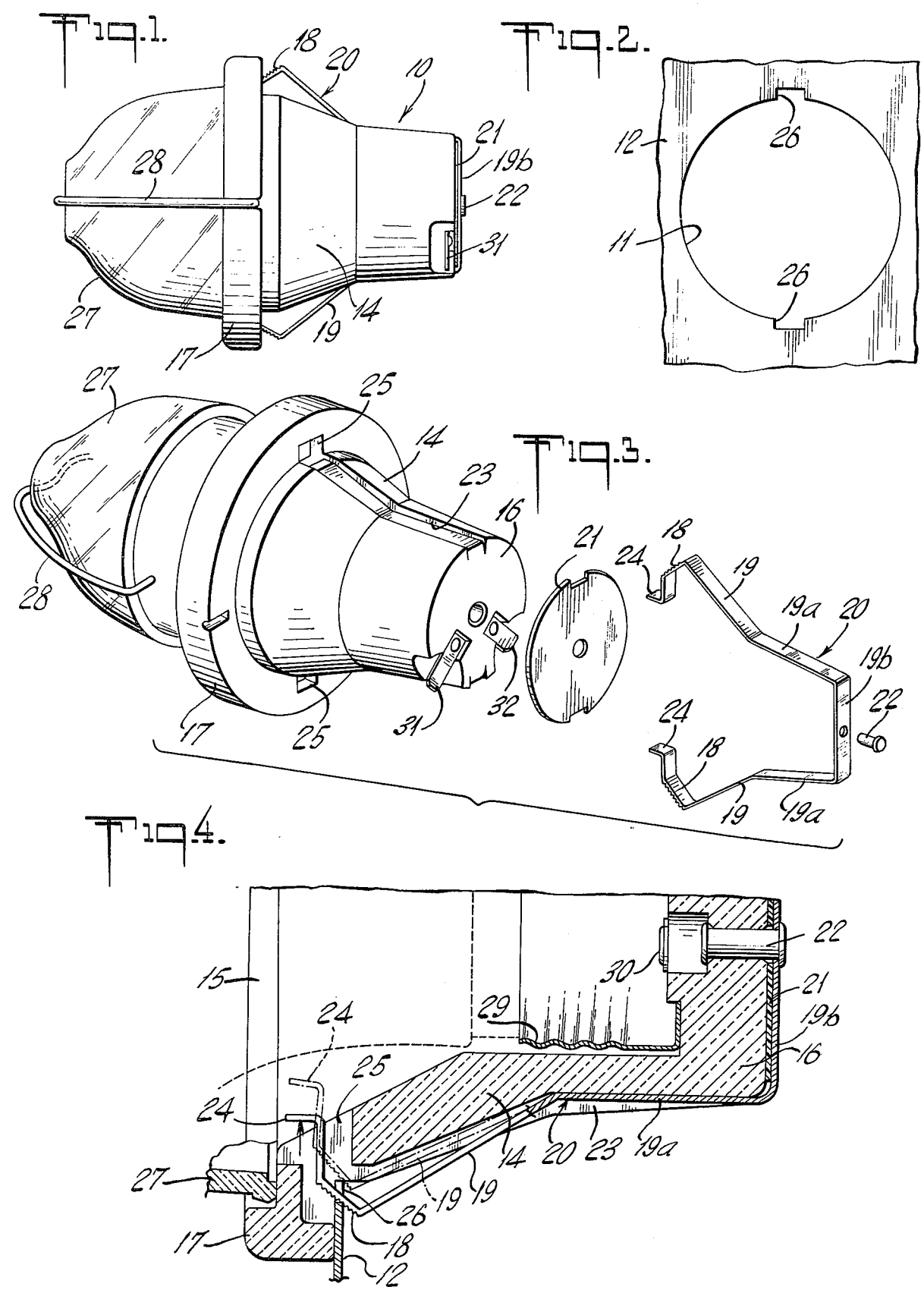

COVERED ELECTRICAL RECEPTACLE WITH SNAP-IN MOUNTING

FIELD OF THE INVENTION

The present invention relates to a new and improved covered receptacle for mounting an electrical wiring device in an enclosure. It relates, more particularly, to a covered receptacle mounted in a panel of an enclosure with a snap-in mounting which is protected from contamination and is releasable from a front face of the receptacle.

DESCRIPTION OF THE PRIOR ART

Generally speaking, receptacles for electrical sockets or the like have been installed in enclosures such as ovens or the like with snap-in mountings. However, in such installations the mountings are not protected from the effects of contamination from within the enclosure. The present invention provides such protection and avoids this problem.

OBJECTS AND SUMMARY OF THE INVENTION

An object of the present invention is to provide a covered receptacle for an enclosure which is releasably secured in a wall of the enclosure by a snap-in mounting which is releasable from a front face of the receptacle when the cover is removed. Such an arrangement, prevents liquids and other material from contacting or contaminating the mounting mechanism when the cover is in place.

Another object of the invention is to provide a covered receptacle with a reliable and inexpensive snap-in mounting which is releasably operable from a front face of the receptacle when a cover is removed.

Other objects and advantages of the invention will become apparent and be better understood from the following description when read in connection with the accompanying drawing.

BRIEF DESCRIPTION OF THE DRAWING

FIG. 1 is a side view of a receptacle unit embodying the invention;

FIG. 2 is a plan view of a panel having an opening to receive the receptacle shown in FIG. 1;

FIG. 3 is an exploded view in perspective to the receptacle shown in FIG. 1; and FIG. 4 is a fragmentary view in vertical section illustrating a position of the receptacle shown in FIG. 1 as installed on the panel shown in FIG. 2.

DESCRIPTION OF THE PREFERRED EMBODIMENT

Referring now to the drawing in detail, there is an enclosed receptacle 10. The receptacle 10 is of a type which is mounted in an opening 11 in a panel 12 forming a wall of an oven or other enclosure by means of a snap-in mounting device 13.

The receptacle 10 has a hollow funnel-shaped body 14 of ceramic or the like with an opening 15 at a front end thereof and a rear end 16 which is closed. The rear end 16 of the body 10 is shaped to fit into and extend through the opening 11 in the panel 12. The front end of the body 10 carries an outwardly extending flange 17 which surrounds the opening 15. As shown best in FIG. 4, the flange 17 rests against an outer face of the panel 12 in opposing relation to inwardly inclined arms 18 of a snap-in mounting member 20.

The arms 18 are formed at the ends of the pair of spring legs 19, and extend through spaced notches 26 in the panel opening 11.

The spring legs 19 include members 19a which are connected by an end member 19b and form a yoke 20 which extends around the rear end of the body 14. A spacing disc 21 of fiber or the like is located between the rear end 16 of the body and the end member 19b of the yoke 20. The yoke 20 and the disc 21 are held to the rear end 16 of the body 14 by a drive pin 22 or other suitable fastening means.

The side member 19a of the yoke 20 extends forwardly through slots 23 on opposite sides of the body 14. Finger grips 24 are carried by the inclined arms 18 and extend inwardly through openings 25 in the body 14 to a position within the opening 15 at a front end body so that they can be gripped from within the opening 15 and forced inwardly (as indicated in FIG. 4 by dot and dash lines) to release the inwardly inclined arms 18 from engagement with the panel 12 to permit withdrawal of the entire unit.

For alignment purposes, the opening 11 in the panel 12 may contain the notches 26 to receive the inclined arms 18 of the yoke 20.

When the receptacle 10 has been installed in the panel 12, a removable translucent cover 27 of glass or the like encloses the opening 15 at the front end of the body 14 and the ends of the cover rest against the flange 17. A wire clip 28 may be employed to secure the cover 27 in place. Thus, the cover 27 protects the interior of the body and an electrical wiring device therein. In the form illustrated, there is a lamp socket having a screw shell 29 and a center contact 30 mounted in at the closed end 16 of the body 14. In this arrangement, the release fingers 24 of the snap-in mounting and the slots 25 in the body 14 are covered and protected when the enclosure is in use or is being cleaned.

Clip on wiring terminals 31 and 32 are provided on the rear end 16 of the body 14 and are connected to the screw shell 29 and the center contact 30 respectively. The terminals 31 and 32 receive clip-on connectors attached to ends of conductor wires (not shown).

In removal of the unit, the cover 27 is first removed. Removal of the cover 27 provides access to the release finger tabs 24. The tabs 24 can then be forced together to release the receptacle or unit from engagement with the panel 12. The unit can then be withdrawn from the panel to a point where the wires (not shown) can be removed from the terminals 31 and 32 if necessary. This permits the entire receptacle to be readily removed for replacement or repair as desired. During use, the entire receptacle is protected by the cover 27.

While a preferred embodiment of the invention has been descirbed and illustrated herein, it will be understood that various changes and modifications may be made therein by persons skilled in the art without departing from the spirit or scope of the invention.

What is claimed is:

1. An electrical receptacle for removably mounting a wiring device in an opening of a panel, which comprises:
    a. a hollow housing of insulating material;
    b. said housing having an open front end and having a closed rear end for receiving and supporting a wiring device therein;

c. said rear end of said housing being adapted to pass through an opening in a panel;
d. a supporting flange carried by said housing and extending outwardly therefrom at said front end thereof and resting on a front face of said panel;
e. said flange containing oppositely disposed slots in a lower surface thereof;
f. said slots communicating with a cavity in said housing adjacent said open front end thereof;
g. snap-in mounting means carried by the housing for removably securing said housing in said panel opening;
h. said mounting means including oppositely disposed spring fingers engaging with a rear face of said panel in opposing relation to a rear face of sail flange;
i. said spring fingers having inturned ends extending through said slots and into said open front end of the housing; and
j. a removable cover resting on an outer face of said flange and enclosing said open front end of said housing.

2. An electrical receptacle for removably mounting a wiring device in an opening of a panel as defined in claim 1, which includes:
   a. an electrical wiring device mounted within said hollow housing;
   b. said wiring device being attached to the housing and being removable from the panel therewith.

3. In an electrical receptacle removably mounted in an opening in a panel, the combination comprising:
   a. a hollow housing defining a cavity having an open front end and a closed rear end;
   b. said rear end being adapted to pass through an opening in a panel;
   c. a supporting flange carried by and having oppositely disposed portions extending outwardly from said housing at said front end thereof;
   d. said flange resting on a front face of said panel and containing oppositely disposed slots in a rear face thereof communicating with said cavity in said housing;
   e. snap-in mounting means carried by the housing for releasably securing said housing in said opening;
   f. said snap-in mounting means having oppositely disposed spring members with inwardly extending ends projecting through said slots in said flange to points within said housing and being accessible for operation through said opening;
   g. said spring members including outwardly extending portions opposing a rear face of said panel in opposition to said flange; and
   h. a removable cover resting on an outer face of said flange and extending over said open front end of said housing;
   i. said cover preventing moisture from entering said housing and providing access to said inner ends of said spring members.

4. In an electrical receptacle, the combination as defined in claim 3, which includes:
   a. an electrical wiring device mounted in said hollow housing;
   b. said wiring device being removable from said panel with said housing upon release of the spring fingers from engagement with said rear face of the panel.

5. In an electrical receptacle, the combination as defined in claim 3, wherein:
   a. said flange surrounds said hollow housing at said front end thereof.

* * * * *